(12) United States Patent
Fox

(10) Patent No.: US 9,574,650 B2
(45) Date of Patent: Feb. 21, 2017

(54) COMPACT DIFFERENTIAL GEAR MECHANISM HAVING A DENSELY PACKED PINION BEVEL GEAR ARRAY

(75) Inventor: Matthew G. Fox, Ceresco, MI (US)

(73) Assignee: EATON CORPORATION, Cleveland, OH (US)

( * ) Notice: Subject to any disclaimer, the term of this patent is extended or adjusted under 35 U.S.C. 154(b) by 216 days.

(21) Appl. No.: 14/342,891

(22) PCT Filed: Sep. 5, 2012

(86) PCT No.: PCT/US2012/053772
§ 371 (c)(1),
(2), (4) Date: Oct. 21, 2014

(87) PCT Pub. No.: WO2013/036521
PCT Pub. Date: Mar. 14, 2013

(65) Prior Publication Data
US 2015/0038278 A1     Feb. 5, 2015

Related U.S. Application Data

(60) Provisional application No. 61/531,604, filed on Sep. 6, 2011.

(51) Int. Cl.
| | | |
|---|---|---|
| *F16H 48/00* | (2012.01) | |
| *F16H 48/08* | (2006.01) | |
| *F16H 48/38* | (2012.01) | |

(52) U.S. Cl.
CPC .............. *F16H 48/08* (2013.01); *F16H 48/38* (2013.01); *F16H 2048/087* (2013.01)

(58) Field of Classification Search
CPC ..... F16H 2048/087; F16H 48/08; F16H 48/38
See application file for complete search history.

(56) References Cited

U.S. PATENT DOCUMENTS

| | | | | |
|---|---|---|---|---|
| 1,685,442 A | * | 9/1928 | Wildhaber | ................ B23F 9/10 409/26 |
| 2,445,559 A | * | 7/1948 | Boor | ................... F16H 55/0846 74/459.5 |

(Continued)

FOREIGN PATENT DOCUMENTS

| | | |
|---|---|---|
| EP | 0 864 779 A1 | 9/1998 |
| EP | 1 767 817 A1 | 3/2007 |
| GB | 788105 A | 12/1957 |

OTHER PUBLICATIONS

International Search Report for corresponding International Patent Application PCT/US2012/053772 mailed Nov. 23, 2012.

*Primary Examiner* — Tisha Lewis
(74) *Attorney, Agent, or Firm* — Merchant & Gould P.C.

(57) ABSTRACT

A compact bevel differential gear mechanism with pinion bevel gears arranged in a tightly packed array is disclosed. The compact bevel differential gear mechanism includes first and second side bevel gears that are co-axially aligned along an axis of rotation. The compact bevel differential gear mechanism also includes an array of pinion bevel gears mounted between the first and second side bevel gears. The pinion bevel gears intermesh with the first and second side bevel gears to form a torque transfer arrangement configured for transferring torque between the pinion bevel gears and the first and second side bevel gears and for allowing the first and second side bevel gears to rotate at different rotational speeds with respect to one another. Each of the pinion bevel gears has an actual gear face angle value that is within +/−10 percent of a target gear face angle value. The target gear face angle value is equal to 360 degrees divided by twice the total number of pinion bevel gears provided in the array of pinion bevel gears.

18 Claims, 8 Drawing Sheets

(56) References Cited

U.S. PATENT DOCUMENTS

| | | | |
|---|---|---|---|
| 2,778,240 A | * | 1/1957 | Prester ................ F16H 55/0846 74/459.5 |
| 3,593,595 A | | 7/1971 | Taylor |
| 3,906,812 A | | 9/1975 | Kagata |
| 3,955,443 A | | 5/1976 | Estrada |
| 3,974,717 A | | 8/1976 | Breed et al. |
| 4,363,248 A | | 12/1982 | Brisabois |
| 4,959,043 A | | 9/1990 | Klotz et al. |
| 6,056,663 A | | 5/2000 | Fett |
| 6,083,133 A | | 7/2000 | Dye |
| 7,749,124 B2 | | 7/2010 | Nakajima |

* cited by examiner

COMPACT DIFFERENTIAL GEAR MECHANISM HAVING A DENSELY PACKED PINION BEVEL GEAR ARRAY

CROSS-REFERENCE TO RELATED APPLICATION

This application is a National Stage Application of PCT/US2012/053772 filed 5 Sep. 2012, which claims benefit of U.S. patent application Ser. No. 61/531,604, filed on 6 Sep. 2011 and which applications are incorporated herein by reference. To the extent appropriate, a claim of priority is made to each of the above disclosed applications.

TECHNICAL FIELD

The present disclosure relates generally to bevel-style differential gear systems. More particularly, the present disclosure relates to a bevel-style differential gear system including a set of pinion bevel gears that intermesh between a pair of side bevel gears.

BACKGROUND

A differential is a component of an axle assembly that is used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a gear arrangement that allows torque to be transferred from the driveshaft to the output shafts while concurrently allowing the output shafts to rotate at different speeds as needed.

To address increased fuel costs, the automotive industry has been driven to provide vehicles with increased fuel economy. To increase fuel economy, vehicle designers have looked for ways to remove weight from vehicles. Additionally, smaller vehicles have become more prevalent. In this environment, there is a need for differentials having reduced size and weight without loss of torque capacity when compared to conventional differential designs.

SUMMARY

One aspect of the present disclosure relates to a compact bevel-style differential gear system that requires less space than traditional bevel-style differential gear systems. In traditional bevel-style differential gear systems the pinion gears are typically sized and shaped in such a manner that a significant amount of space between them is vacant and unused. In contrast, compact bevel-style differential gear systems in accordance with the principles of the present disclosure are designed to effectively utilize the space between the pinion bevel gears. This allows compact bevel-style differential gear systems in accordance with the principles of the present disclosure to have a reduced differential hub span, a lower moment of inertial, a reduced differential diameter, a reduced overall differential size, a reduced overall differential weight and enhanced torque capacity when compared to traditional bevel-style differential gear systems.

A further aspect of the present disclosure relates to a compact bevel-style differential gear system configured for evenly distributing axle torque around a differential casing thereby reducing the number of stress risers and allowing optimized window geometry and thinner case cross sections. In this way, the differential case can be reduced in weight as compared to the differential cases used with conventional two or four pinion differential gear systems.

Another aspect of the present disclosure relates to a compact bevel differential gear system including first and second side bevel gears that are co-axially aligned along an axis of rotation. The compact bevel differential gear mechanism also includes a densely packed array of pinion bevel gears mounted between the first and second side bevel gears. The densely pack array of pinion bevel gears includes a total number of pinion bevel gears. The pinion bevel gears of the densely packed array of pinion bevel gears intermesh with the first and second side bevel gears to form a torque transfer arrangement configured for transferring torque between the pinion bevel gears and the first and second side bevel gears and for allowing the first and second side bevel gears to rotate at different rotational speeds with respect to one another. Each of the pinion bevel gears has an actual gear face angle value that is at least 90 percent of a target gear face angle value. The target gear face angle value is equal to 360° divided by twice the total number of pinion bevel gears in the densely packed array of pinion bevel gears.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to exemplary aspects of the present disclosure that are illustrated in the accompanying drawings. Wherever possible, the same reference numbers will be used throughout the drawings to refer to the same or like structures.

The present disclosure relates generally to a compact bevel-style differential gear system that requires less space in a differential housing than a typical bevel-style differential gear system while maintaining comparable or enhanced torque capacity. In certain embodiments, compact bevel-style differential gear systems in accordance with the principles of the present disclosure can include a densely packed pinion bevel gear set (i.e., an array of pinion bevel gears) mounted between two side bevel gears. In certain embodiments, the densely packed pinion bevel gear sets can include four or more pinion bevel gears (e.g., six pinion bevel gears, eight pinion bevel gears, etc.). In certain embodiments, the side bevel gears and the pinion bevel gears can be sized and shaped in such a manner that the space between the pinion bevel gears is minimized. By effectively utilizing the available design space in a differential housing, the differential hub span, the differential size, the differential weight and the differential spin losses can all be favorably impacted. Designs in accordance with the principles of the present disclosure can take into account factors such as the number of pinion bevel gear teeth, the number of side bevel gear teeth, the diametral pitch of the bevel side gears, the spherical radii of the pinion bevel gears, the outside diameters of the pinion bevel gears, the face angles of the pinion bevel gears and the outside diameters of the side bevel gears.

Figure 1:
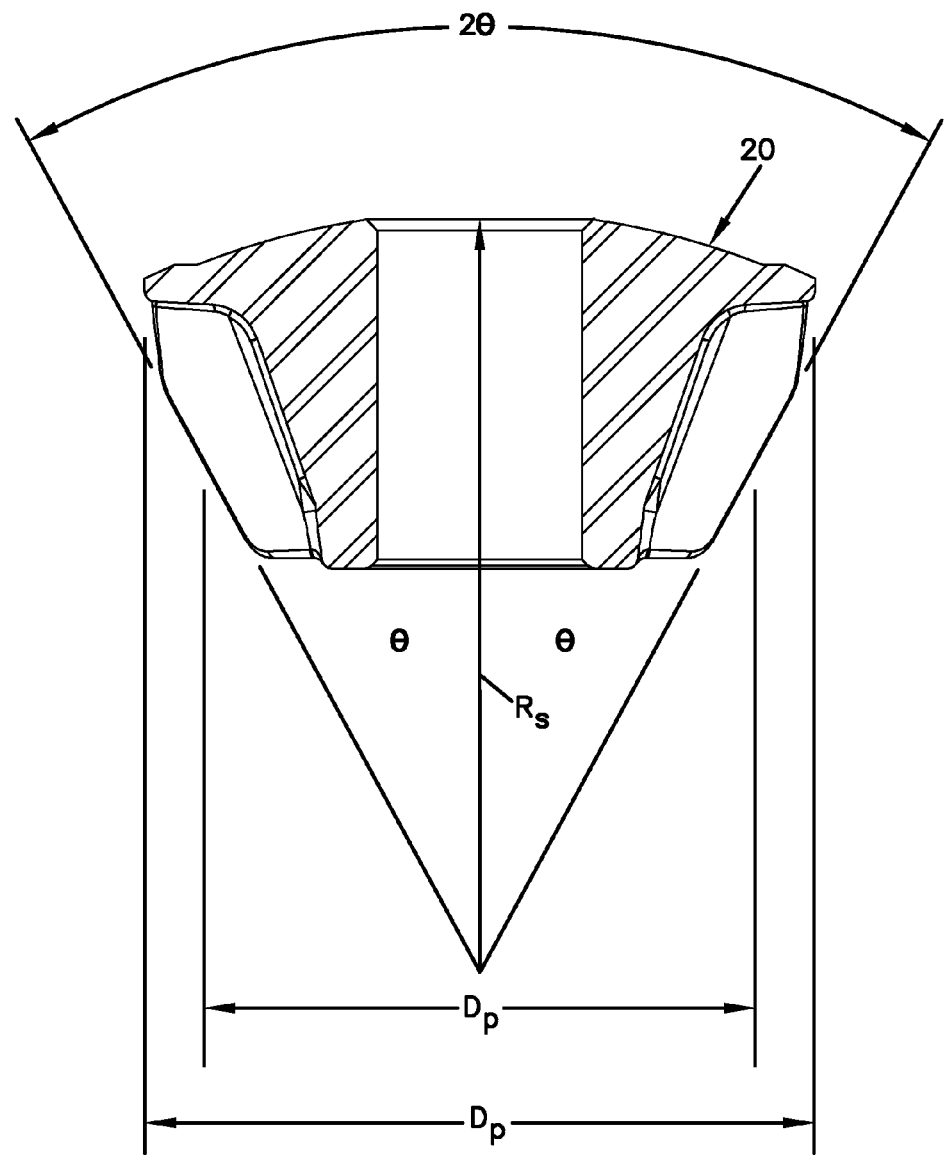
FIG. 1 illustrates a bevel gear.

FIG. 1 shows an example bevel gear 20 with various geometry features labeled. As shown in FIG. 1, $\theta$ represents the gear face angle of the bevel gear, $R_s$ represents the spherical radius of the bevel gear 20, $D_p$ represents the pitch diameter of the bevel gear 20 and $D_o$ represents the outer diameter of the bevel gear 20. The diametral pitch of the bevel gear 20 is calculated by dividing the total number of teeth of the bevel gear 20 by the pitch diameter $D_p$ in inches.

Figure 2:
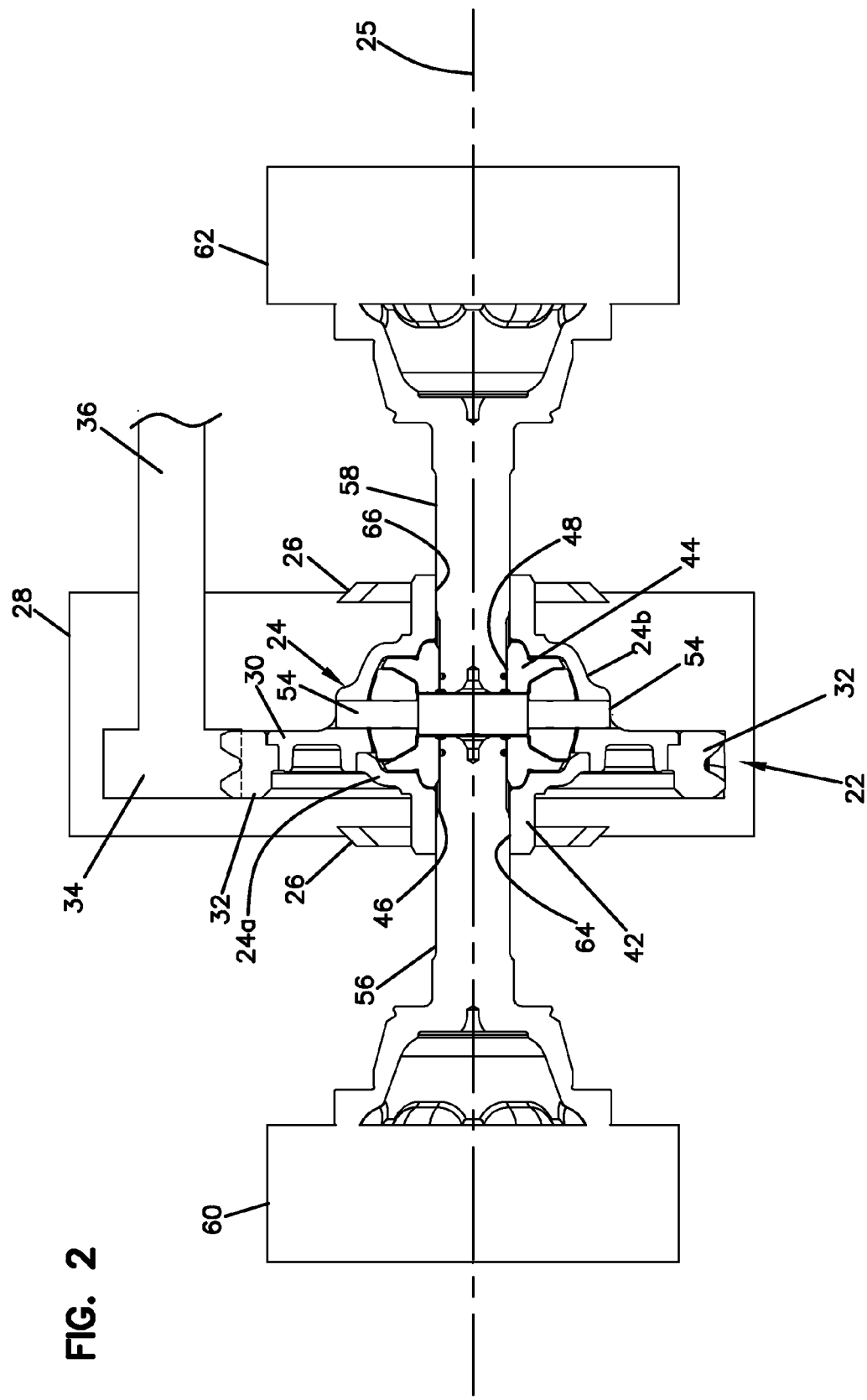
FIG. 2 illustrates a compact differential in accordance with the principles of the present disclosure; the compact differential is schematically shown incorporated into a vehicle drive system and includes a densely packed array of six pinion bevel gears intermeshed between two side bevel bears.
Figure 3:
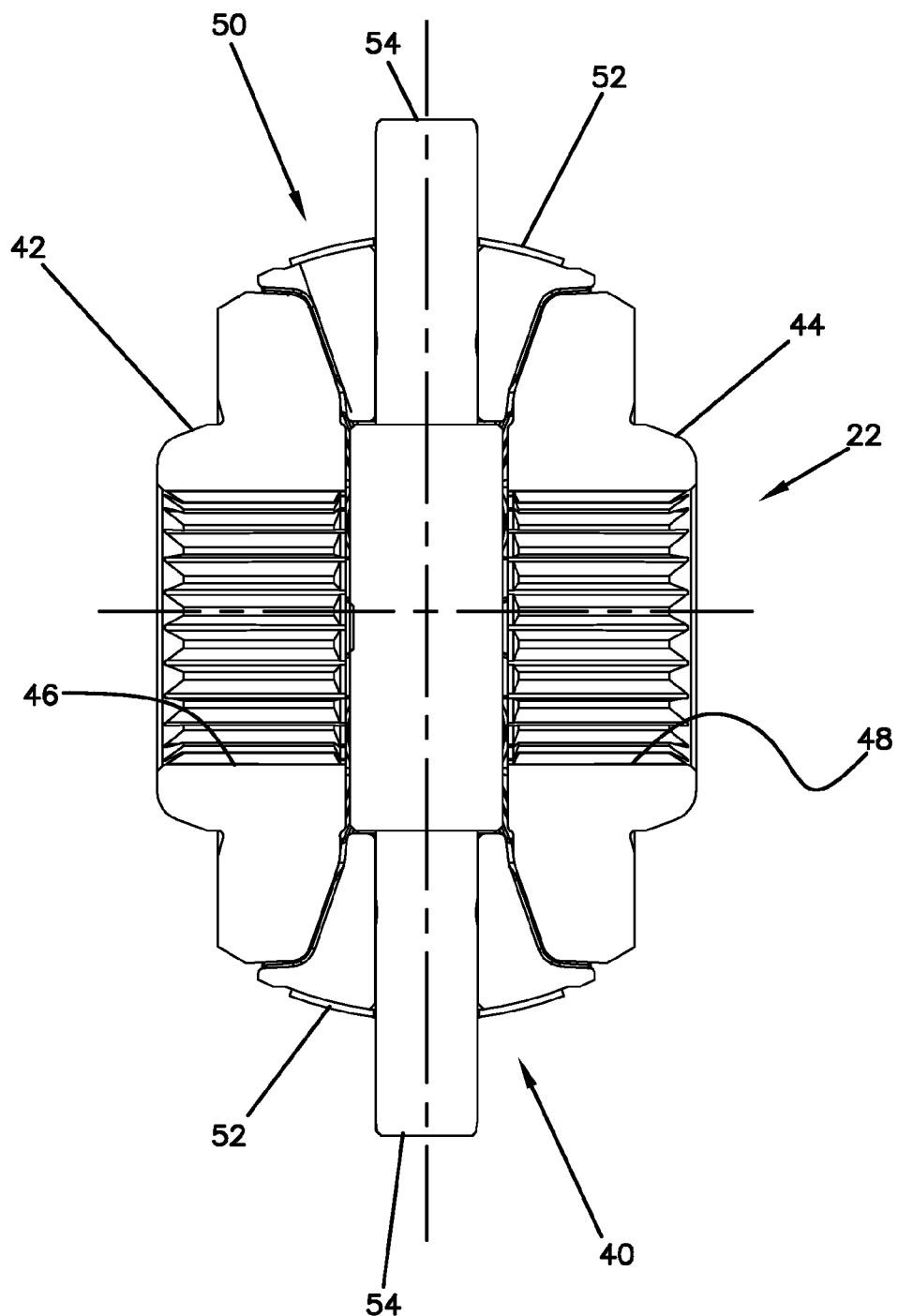
FIG. 3 is a cross-sectional view showing side bevel gears and pinion bevel gears of the compact differential of FIG. 2.
Figure 4:
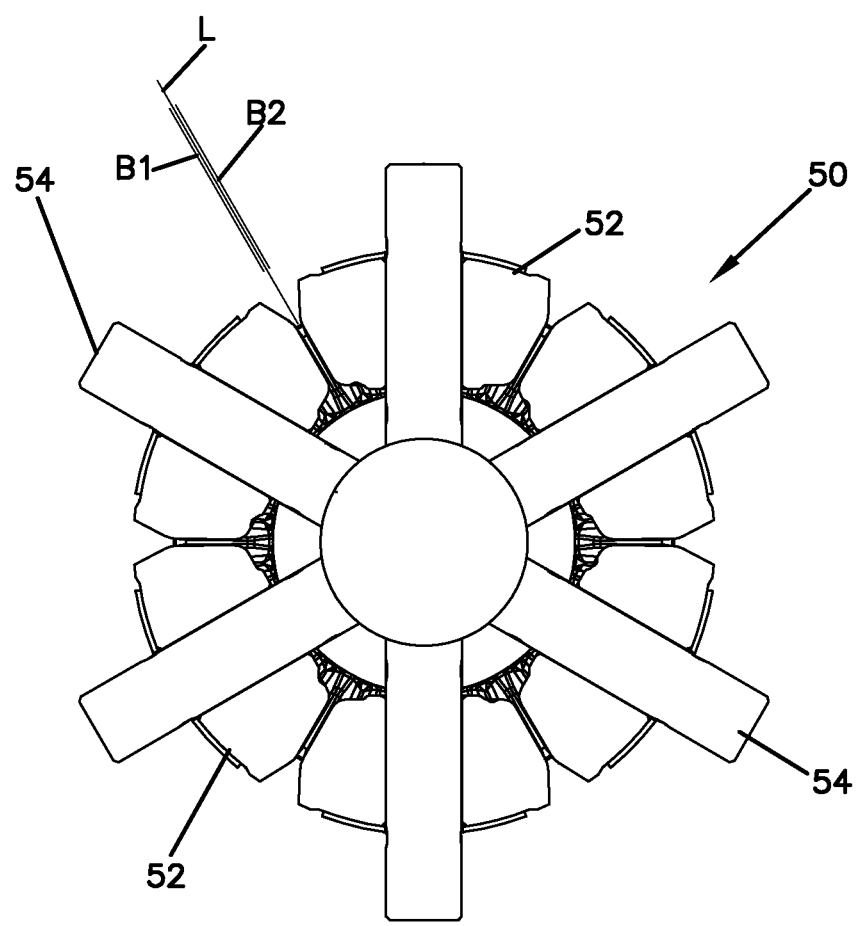
FIG. 4 is an end view of the compact differential of FIG. 3 with one of the side bevel gears removed to better show the densely packed array of pinion bevel gears.
Figure 5:
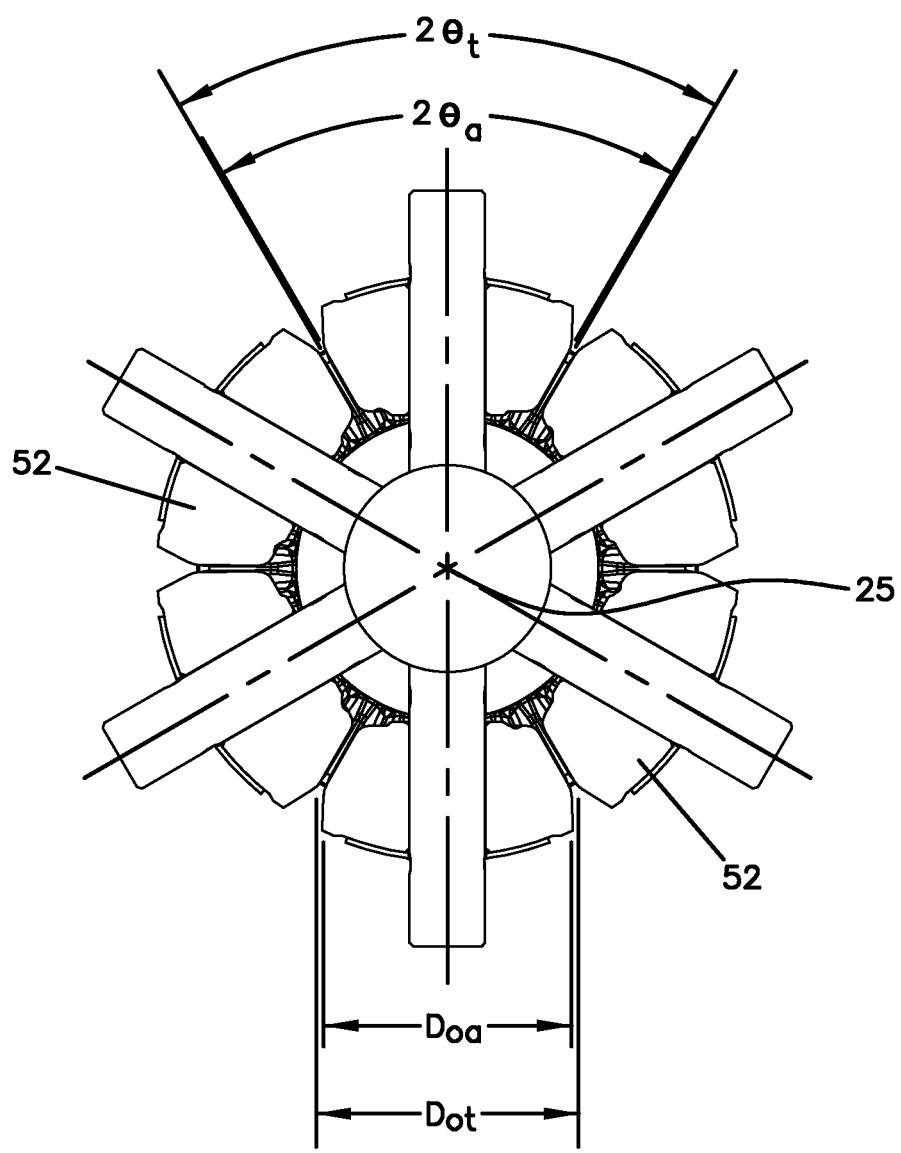
FIG. 5 schematically shows a pinion bevel gear lay-out for the compact differential of FIGS. 2-4.

FIGS. 2-4 illustrate a compact differential 22 in accordance with the principles of the present disclosure. The compact differential 22 includes a differential housing 24 that in use is rotated about a rotation axis 25. Bearings 26 are provided at opposite ends of the differential housing 24. The bearings 26 are co-axially aligned along the rotation axis 25 and are configured for rotatably mounting the differential housing 24 within an outer housing 28 (e.g., a differential carrier as shown schematically in FIG. 2). The differential housing 24 includes a first housing piece 24a and a second housing piece 24b. The housing pieces 24a, 24b can be secured together by fasteners, welding or other techniques. The differential housing 24 includes a flange 30 for mounting a ring gear 32. In use of the compact differential 22, the ring gear 32 intermeshes with a drive gear 34 driven by a driveshaft 36. As the drive gear 34 is rotated by the driveshaft 36, the drive gear 34 engages the ring gear 32 thereby causing rotation of the differential housing 24 about the rotation axis 25.

Referring still to FIGS. 2-4, the compact differential 22 includes a torque transfer arrangement 40 mounted within the housing 24. The torque transfer arrangement 40 includes first and second side bevel gears 42, 44 (e.g., sun gears) that respectively define first and second output shaft openings 46, 48 that are coaxially aligned along the rotation axis 25. The torque transfer arrangement 40 also includes a gear set 50 (e.g., a planetary gear set) mounted between the first and second side bevel gears 42, 44. The gear set 50 can be referred to as a "spider" and is configured for transferring torque between the differential housing 24 and the first and second side bevel gears 42, 44 while concurrently permitting the first and second side bevel gears 42, 44 to rotate relative to one another (e.g., at different rotational speeds) about the rotation axis 25. The gear set 50 includes a densely packed array of pinion bevel gears 52. Each of the pinion bevel gears 52 is rotatably mounted on a separate shaft 54 fixed relative to the differential housing 24. Each of the pinion bevel gears 52 intermeshes with both the first side bevel gear 42 and the second side bevel gear 44. In other embodiments, multiple pinion bevel gears may be mounted on a common shaft secured to the differential housing 24.

In use of the compact differential 22, first and second output shafts 56, 58 (see FIG. 2) are preferably coupled to the compact differential 22. The first and second output shafts 56, 58 are also shown coupled to respective first and second wheels 60, 62. The first output shaft 56 is rotatably received within a first output shaft opening 64 defined by the first housing piece 24a of the differential housing 24. The first output shaft 56 is also rotationally fixed within the first output shaft opening 46 of the first side bevel gear 42 by means such as splines or other torque transfer means. The second output shaft 58 is rotatably received within a second output shaft opening 66 defined by the second housing piece 24b. The second output shaft 58 is also rotationally fixed within the second output shaft opening 48 defined by the second side bevel gear 44 by means such as splines or other torque transfer means.

Figure 6:
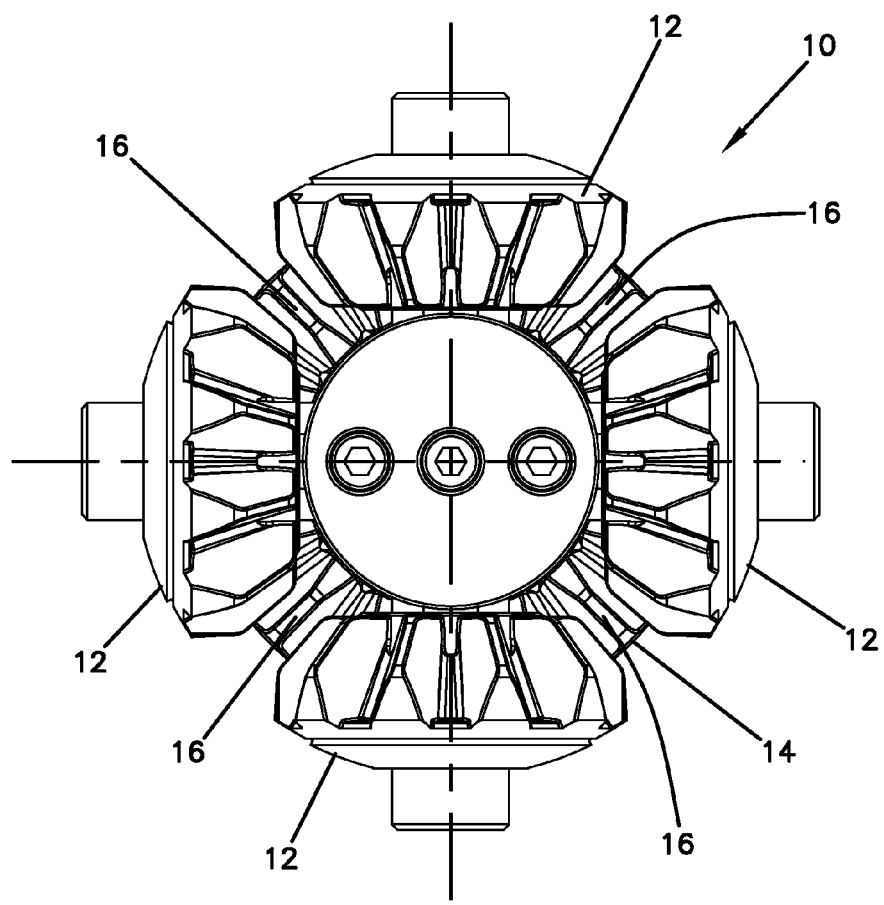
FIG. 6 shows a pinion bevel gear lay-out for a prior art differential.

Referring to FIG. 6, a prior art bevel-style differential gear system 10 is depicted. The differential gear system 10 includes four pinion bevel gears 12 mounted between a pair of side bevel gears 14 (only one shown). The pinion bevel gears 12 are sized and shaped such that a substantial amount of unclaimed space 16 exists between the bevel pinion gears 12. By not effectively using the unclaimed space, the differential hub span, the differential size and weight and the differential spin losses are all negatively impacted.

The compact differential 22 of FIGS. 2-5 is designed to provide enhanced use of space within the differential housing 24 such that the compact differential 22 has reduced size, weight and spin loss as compared to prior art differentials having similar torque capacities. Pinion gear space utilization can be important in bevel differential gears having four or more pinion bevel gears because pinion pitch diameter is, in a sense, lost by design. Selection of suitable gear sizes and tooth combinations can allow this space to be filled and thus provide the largest possible pinion bevel gear based on the number of pinion bevel gears in the mechanism.

In certain embodiments, the pinion bevel gears 52 can be designed having actual gear face angles $\theta_a$ that are at least 90% of a target face gear angle value $\theta_t$. The target gear face angle $\theta_t$ is defined by the following formula:

$$\theta_t = 360°/(2 \times G_{pb})$$

In the above formula, $G_{pb}$ represents the total number of pinion bevel gears 52 in the pinion bevel gear array of the gear set. In other embodiments, the actual gear face angle $\theta_a$ is at least 95% of the target gear face angle $\theta$. In still other embodiments, the actual gear face angle $\theta_a$ is at least 98% of the target gear face angle $\theta_t$. In further embodiments, the actual gear face angle $\theta_a$ is within +/−10% of the target gear face angle $\theta_t$.

In certain embodiments, the gear faces of adjacent pinion bevel gears are parallel or substantially parallel. In other embodiments, the gear faces of adjacent pinion bevel gears are not parallel. In certain embodiments, the actual gear face angles can be larger than the target gear face angles. In such embodiments, the spherical radii, the outer diameters, the gear teeth addendum and the gear teeth dedendum of the pinion bevel gears can be designed to prevent contact/interference between the adjacent pinion bevel gears. In certain embodiments, the gear teeth of the pinion bevel gears are designed to have a running clearance between the gear teeth of adjacent pinion bevel gears of 0.8 millimeters plus or minus 10%. In certain embodiments, the pinion bevel gears are designed by setting pinion bevel gear boundaries B1, B2 (see FIG. 4) that are offset a predetermined amount (e.g., 0.4 millimeters plus or minus 10%) on opposite sides of a line L (see FIG. 4) corresponding the target face gear angle. Adjacent pinion bevel gears are then shaped (e.g., by adjusting the addendum and dedendum) to run as close to their corresponding bevel gear boundaries B1, B2. The offsets ensure that adequate running clearance is provided between adjacent pinion bevel gears and are based on the manufacturing tolerances for manufacturing (e.g., forging) the pinion bevel gears. In certain embodiments, the running clearance between adjacent pinion bevel gears is less than 1.5 mm or more preferably less than 1.0 mm.

In the embodiment of FIGS. 2-5, the gear set 50 includes a densely packed array of pinion bevel gears including six pinion bevel gears 52. Thus, the target gear face angle $\theta_t$ for this embodiment is 30°. In certain embodiments, the actual gear face angle $\theta_a$ for this bevel gear array is at least $0.9 \times \theta_t$ (i.e., 27°). In other embodiments, the actual gear face angle $\theta_a$ for this bevel gear array is at least $0.95 \times \theta_t$ (i.e., 28.5°). In still other embodiments, the actual gear face angle $\theta_a$ for this bevel gear array is at least $0.98 \times \theta_t$ (i.e., 29.4°). In further embodiments, the actual gear face angle $\theta_a$ for this bevel gear array is at least 29.5°. In still another embodiment, the actual gear face angle $\theta_a$ for this bevel gear array is 29.58°. In still other embodiments, the actual gear face angle $\theta_a$ for this bevel gear array is within +/−10 percent of $\theta_t$ (i.e., 27°-33°). The actual and target pinion gear face angles $\theta_a$ and $\theta_t$ are labeled on FIG. 5.

In certain embodiments, the pinion bevel gears 52 can each have an actual pinion gear outside diameter $D_{oa}$ that is at least 80% of a target pinion gear outside diameter $D_{ot}$. The target pinion gear outside diameter $D_{ot}$ is defined by the following formula:

$$D_{ot} = 2 \times R_s \times \sin(\theta_t)$$

In the above formula, $R_s$ is the spherical radius of the pinion bevel gears 52 and $\theta_t$ is the target gear face angle of the pinion bevel gears 52. In other embodiments, each of the pinion bevel gears 52 has an actual outside diameter value $D_{oa}$ that is at least 85% or at least 90% of the target outside diameter $D_{ot}$.

In the embodiment of FIGS. 2-5, the pinion bevel gears 52 can be provided with ten pinion teeth and the side bevel gears 42, 44 can be provided with twenty-four side teeth. In one example of this embodiment, the side gears 42, 44 can have a diametral pitch of 9.5. In one example of this embodiment, the side bevel gears 42, 44 can have outside diameter of 2.577 inches. In one example of this embodiment, the pinion bevel gears 52 can each have a spherical radius of 1.53543307 inches. The pinion bevel gears 52 have a target outside diameter $D_{ot}$ equal to 1.516 inches and an actual outside diameter $D_{oa}$ of 1.321 inches.

Figure 7:
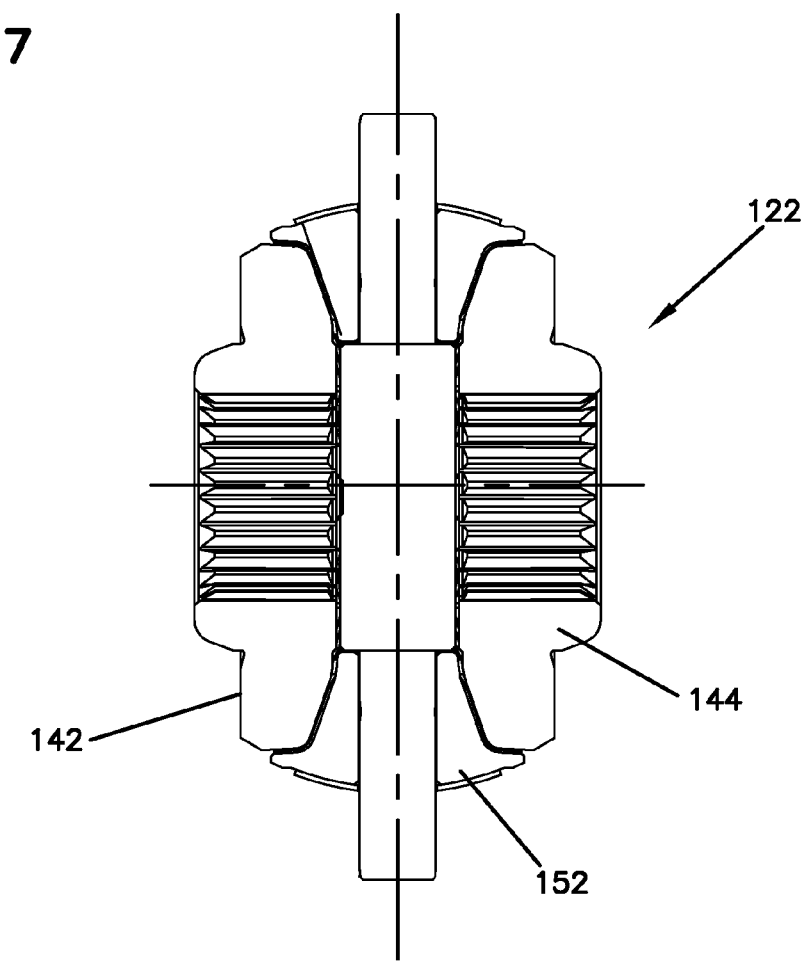
FIG. 7 is a cross-sectional view showing another compact differential in accordance with the principles of the present disclosure; the compact differential includes a densely packed array of eight pinion bevel gears intermeshed between two side bevel gears.
Figure 8:
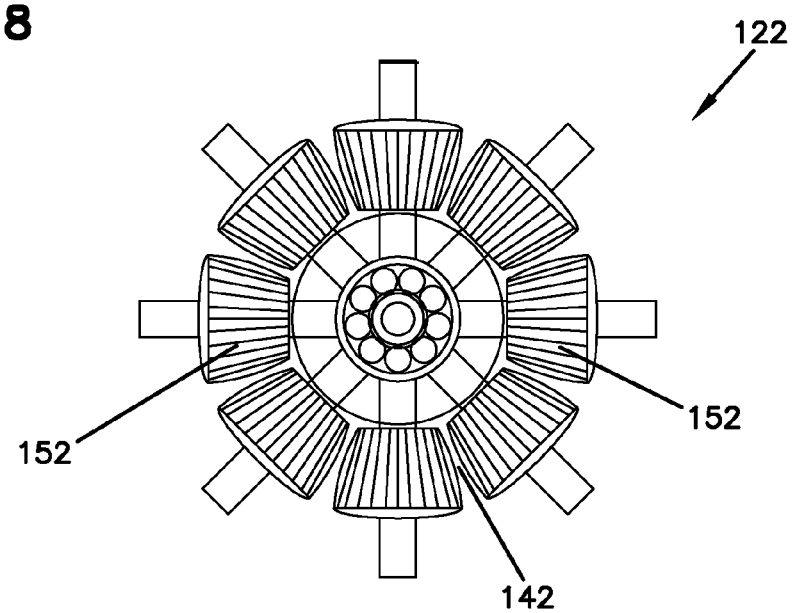
FIG. 8 is an end view of the compact differential of FIG. 7 with one of the side bevel gears removed to better show the densely packed array of pinion bevel gears.
Figure 9:
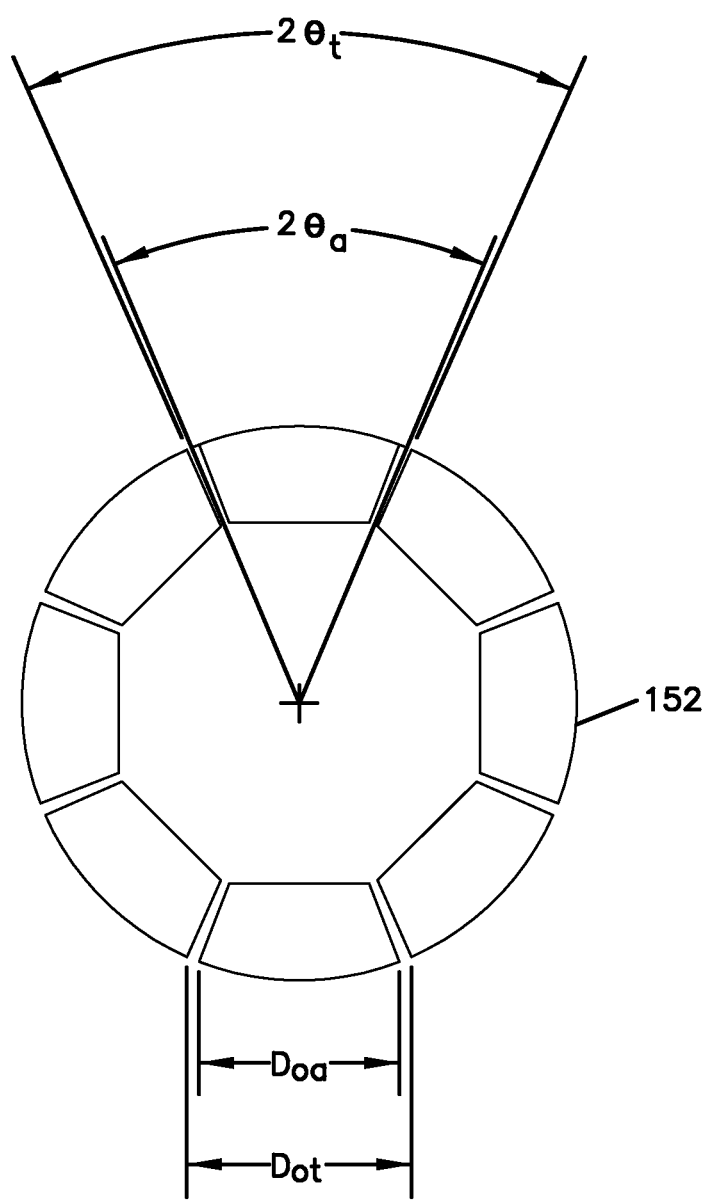
FIG. 9 is a schematic pinion gear lay-out for the compact differential of FIGS. 7 and 8.

FIGS. 7-9 illustrate another differential 122 in accordance with the principles of the present disclosure. The differential 122 has a similar configuration to the differential 22, except eight pinion bevel gears 152 are provided between first and second side bevel gears 142, 144. Thus, the target gear face angle $\theta_t$ for this embodiment is 22.5°. In certain embodiments, the actual gear face angle $\theta_a$ for this bevel gear array is at least $.9 \times \theta_t$ (i.e., 20.25°). In other embodiments, the actual gear face angle $\theta_a$ for this bevel gear array is at least $.95 \times \theta_t$ (i.e., 21.36°). In still other embodiments, the actual gear face angle $\theta_a$ for this bevel gear array is at least $.98 \times \theta_t$ (i.e., 22.05). In further embodiments, the actual gear face angle $\theta_a$ for this bevel gear array is at least 22.25. In still another embodiment, the actual gear face angle $\theta_a$ for this bevel gear array is 22.9. In some embodiments, the actual gear face angle $\theta_a$ is in the range of 20.25° to 24.75°. The actual and target pinion gear face angles $\theta_a$ and $\theta_t$ are labeled on FIG. 9.

In the embodiment of FIGS. 7-9, the pinion bevel gears 52 can be provided with ten pinion teeth and the side bevel gears 42, 44 can be provided with thirty-two side teeth. In one example of this embodiment, the side gears 42, 44 can have a diametral pitch of 12. In one example of this embodiment, the side bevel gears 42, 44 can have outside diameter of 2.696 inches. In one example of this embodiment, the pinion bevel gears 52 can each have a spherical radius of 1.62401575 inches. The pinion bevel gears 52 have a target outside diameter $D_{ot}$ equal to 1.264 inches and an actual outside diameter $D_{oa}$ of 1.058 inches.

Table 1, provided below, lists tooth combinations that provide adequate gear strength for four, six and eight pinion bevel differential gear mechanisms. For each of the embodiments, Table 1 lists the number of pinion teeth provided on the pinion bevel gears, the number of side teeth provided on the side bevel gears, the diametral pitch of the side bevel gears, the spherical radii of the pinion bevel gears (inches), the target outside diameters of the pinion bevel gears (inches), the actual outside diameters of the pinion bevel gears (inches), the actual gear face angles of the pinion bevel gears (degrees), the outside diameters of the side gears (inches), and the amount the actual pinion gear outside diameters are undersized as compared to the target pinion gear outside diameters (inches). Embodiments of the type listed at Table 1 can be constructed having a relatively narrow hub span, a relatively small barrel diameter, a relatively low weight and a relatively low moment of inertia as compared to typical prior art bevel differential gear mechanisms having comparable torque capacities. The narrower hub span, the smaller barrel diameter, the lower weight and the lower moment of inertia can, alone or in combination, promote greater fuel economy. Additionally, the compact nature of bevel differential gear mechanisms in accordance with the principles of the present invention allows such mechanisms to be used in applications having limited space constraints.

TABLE 1

| Number Pinion Teeth | Number Side Teeth | Diametral Pitch | Spherical Radius (in) | POD Target (in) | Pinion Outside Diameter (POD) (in) | Pinion Face Angle (PFA) (degrees) | Side Outside Diameter (in) | Pinion Undersized (in) |
|---|---|---|---|---|---|---|---|---|
| Four Pinion | | | | | | | | |
| 10 | 16 | 6.45 | 1.62401575 | 2.127 | 1.887 | 40.9 | 2.6 | 0.240 |
| 11 | 16 | 6.48 | 1.62401575 | 2.215 | 2.014 | 43.0 | 2.6 | 0.201 |
| 12 | 16 | 6.52 | 1.62401575 | 2.289 | 2.135 | 44.8 | 2.6 | 0.154 |

TABLE 1-continued

| Number Pinion Teeth | Number Side Teeth | Diametral Pitch | Spherical Radius (in) | POD Target (in) | Pinion Outside Diameter (POD) (in) | Pinion Face Angle (PFA) (degrees) | Side Outside Diameter (in) | Pinion Undersized (in) |
|---|---|---|---|---|---|---|---|---|
| Six Pinion ||||||||||
| 10 | 24 | 9.5 | 1.53543307 | 1.516 | 1.321 | 29.58 | 2.577 | 0.195 |
| Eight Pinion ||||||||||
| 10 | 32 | 12 | 1.62401575 | 1.264 | 1.058 | 22.9 | 2.696 | 0.206 |

One example of an embodiment in accordance with the principles of the present disclosure having a pinion bevel gear array with 6 bevel gears was compared to a known differential having a pinion bevel gear array with two pinion bevel gears. The two differentials being compared had comparable torque capacities. In this comparison the six-pinion compact bevel differential provided about an 8.5% reduction in weight, about a 5.7% reduction in barrel diameter, about a 29.9% reduction in hub span, about a 29.5% reduction in side gear span, about a 4.9% reduction in spherical radius, and about a 24.5% reduction in moment of inertia. The source of the percentages is set forth in Table 2 provided below.

TABLE 2

| | Weight (lb.) | Barrel Diameter | Hub Span | Side Gear Span | Spherical Radius | Principal Moment of Inertia g * mm² |
|---|---|---|---|---|---|---|
| OEM OPEN DIFFERENTIAL |||||||
| | 8.25 | 106.00 | 107.00 | 59.00 | 41.00 | 6991927 |
| Compact Bevel 6 Pinion |||||||
| | 7.54 | 100.00 | 75.00 | 41.60 | 39.00 | 5279501 |
| % REDUCTION | 8.5% | 5.7% | 29.9% | 29.5% | 4.9% | 24.5% |

The invention claimed is:

1. A bevel differential gear mechanism comprising:
first and second side bevel gears that are co-axially aligned along an axis of rotation; and
an array of pinion bevel gears mounted between the first and second side bevel gears, the array of pinion bevel gears including a total number of pinion bevel gears, the pinion bevel gears intermeshing with the first and second side bevel gears to form a torque transfer arrangement configured for transferring torque between the pinion bevel gears and the first and second side bevel gears and for allowing the first and second side bevel gears to rotate at different rotational speeds with respect to one another, each of the pinion bevel gears having an actual gear face angle value that is at least 90 percent of a target gear face angle value, the target gear face angle value being equal to 360 degrees divided by twice the total number of pinion bevel gears, wherein the array of pinion bevel gears includes at least six pinion bevel gears, wherein each of the pinion bevel gears has an actual outside diameter value that is at least 80 percent of a target outside diameter value, wherein each of the pinion bevel gears has a spherical radius, and wherein the target outside diameter value for each of the pinion bevel gears is equal to 2 times the spherical radius multiplied by sine of the target gear face angle value.

2. The bevel differential gear mechanism of claim 1, wherein each of the pinion bevel gears has an actual gear face angle value that is at least 95 percent of the target gear face angle value.

3. The bevel differential gear mechanism of claim 1, wherein each of the pinion bevel gears has an actual gear face angle value that is at least 98 percent of the target gear face angle value.

4. The bevel differential gear mechanism of claim 1, wherein each of the pinion bevel gears has an actual outside diameter value that is at least 85 percent of the target outside diameter value.

5. The bevel differential gear mechanism of claim 1, wherein each of the pinion bevel gears has an actual outside diameter value that is at least 90 percent of the target outside diameter value.

6. The bevel differential gear mechanism of claim 1, wherein each of the pinion bevel gears has an actual gear face angle value that is within +/−10 percent of the target gear face angle value.

7. A bevel differential gear mechanism comprising:
a differential casing including an exterior flange for mounting a ring bevel gear, the differential casing defining first and second output shaft openings that are co-axially aligned along an axis of rotation of the casing;
first and second side bevel gears rotatably mounted within the differential casing, the first and second side bevel gears being co-axially aligned along the axis of rotation of the casing, the first side bevel gear defining a first shaft opening configured to provide a first torque transmitting connection with a first output shaft received within the first output shaft opening, and the second side bevel gear defining a second shaft opening configured to provide a second torque transmitting connection with a second output shaft received within the second output shaft opening; and a plurality of pinion bevel gears mounted between the first and second side bevel gears, the plurality of pinion bevel gears including a total number of pinion bevel gears, the plurality of pinion bevel gears being rotatably mounted on pinion gear shafts secured to the differential casing, the plurality of pinion bevel gears intermeshing with the first and second side bevel gears to form a torque transfer arrangement configured for transferring torque between the pinion bevel gears and the first and second side bevel gears to rotate the first and second side bevel gears about the axis of rotation, the torque transfer arrangement also being configured for allowing the first and second side bevel gears to rotate at different rotational speeds with respect to one another about the axis of rotation, each of the pinion bevel gears having an actual gear face angle value that is at least 90 percent of a target gear face angle value, the target gear face angle value being equal to 360 degrees divided by twice the total number of pinion bevel gears, wherein the array of pinion bevel gears includes at least six pinion bevel gears, wherein each of the pinion bevel gears has an actual outside diameter value that is at least 80 percent of a target outside diameter value, wherein each of the pinion bevel gears has a spherical radius, and wherein the target outside diameter value for each of the pinion bevel gears is equal to 2 times the spherical radius multiplied by sine of the target gear face angle value.

8. The bevel differential gear mechanism of claim 7, wherein each of the pinion bevel gears has an actual gear face angle value that is at least 95 percent of the target gear face angle value.

9. The bevel differential gear mechanism of claim 7, wherein each of the pinion bevel gears has an actual gear face angle value that is at least 98 percent of the target gear face angle value.

10. The bevel differential gear mechanism of claim 7, wherein each of the pinion bevel gears has an actual outside diameter value that is at least 85 percent of the target outside diameter value.

11. The bevel differential gear mechanism of claim 7, wherein each of the pinion bevel gears has an actual outside diameter value that is at least 90 percent of the target outside diameter value.

12. The bevel differential gear mechanism of claim 7, wherein the total number of pinion bevel gears equals six.

13. The bevel differential gear mechanism of claim 12, wherein the pinion bevel gears each have 10 pinion gear teeth, and the side bevel gears each have 24 side gear teeth.

14. The bevel differential gear mechanism of claim 13, wherein each of the pinion bevel gears has an actual gear face angle value that is in the range of 27 to 33 degrees.

15. The bevel differential gear mechanism of claim 7, wherein the total number of pinion bevel gears equals eight, and wherein each of the pinion bevel gears has an actual gear face angle value that is in the range of 20.25 to 24.75 degrees.

16. The bevel differential gear mechanism of claim 15, wherein the pinion bevel gears each have 10 teeth and the side bevel gears each have 32 teeth.

17. The bevel differential gear mechanism of claim 1, wherein a running clearance between adjacent pinion bevel gears is less than 1.5 millimeters.

18. The bevel differential gear mechanism of claim 17, wherein the running clearance is less than 1.0 millimeters.

* * * * *